US012586708B2

(12) United States Patent
Colonna

(10) Patent No.: US 12,586,708 B2
(45) Date of Patent: Mar. 24, 2026

(54) INNOVATIVE PLANAR ELECTROMAGNETIC COMPONENT STRUCTURE

(71) Applicant: 3D PLUS, Buc (FR)

(72) Inventor: Cédric Colonna, Antony (FR)

(73) Assignee: 3D PLUS, Buc (FR)

( * ) Notice: Subject to any disclaimer, the term of this patent is extended or adjusted under 35 U.S.C. 154(b) by 736 days.

(21) Appl. No.: 17/970,478

(22) Filed: Oct. 20, 2022

(65) Prior Publication Data

US 2023/0130364 A1 Apr. 27, 2023

(30) Foreign Application Priority Data

Oct. 26, 2021 (FR) ...................................... 2111347

(51) Int. Cl.
*H01F 27/29* (2006.01)
*H01F 27/28* (2006.01)

(52) U.S. Cl.
CPC ......... *H01F 27/2804* (2013.01); *H01F 27/29* (2013.01)

(58) Field of Classification Search
CPC ........ H01F 27/2804; H01F 27/29; H01F 3/14; H01F 27/346; H01F 2027/2809; H01F 2027/2819; H01F 27/30; H01F 27/288; H01F 27/402; H01F 2005/046; H01F 2027/065
USPC ............................ 336/65, 83, 192, 200, 232
See application file for complete search history.

(56) References Cited

U.S. PATENT DOCUMENTS

| | | | | |
|---|---|---|---|---|
| 5,521,573 | A * | 5/1996 | Inoh | H01F 27/2804 336/200 |
| 5,777,539 | A * | 7/1998 | Folker | H01F 27/2804 336/200 |
| 2002/0070835 | A1 | 6/2002 | Dadafshar | |

OTHER PUBLICATIONS

Schäfer, et al., "Novel Highly Efficient/Compact Automotive PCB Winding Inductors Based on the Compensating Air-Gap Fringing Field Concept", IEEE Transactions on Power Electronics, vol. 35, No. 9, pp. 9619-9633, Sep. 2020.

(Continued)

*Primary Examiner* — Tuyen T Nguyen
(74) *Attorney, Agent, or Firm* — BakerHostetler

(57) ABSTRACT

An innovative planar transformer structure, the transformer includes a primary circuit comprising a primary winding of N1 turns; a secondary circuit comprising a secondary winding of N2 turns; a printed circuit board of layers superposed on one another, forming an aperture defining a perimeter; vias disposed at the centre of the primary and secondary windings on the perimeter of the aperture, the N1 and N2 turns being each disposed on a layer, according to any alternation between the N1 and N2 turns, each of the N1 and N2 turns being wound, partially around vias in forming a circular arc per layer; the circular arc of a layer being distinctly oriented with respect to the circular arcs of the other layers.

4 Claims, 6 Drawing Sheets

(56) References Cited

OTHER PUBLICATIONS

Mohammad, et al., "Planar Transformers with no Common Mode Noise Generation for Flyback and Forward Converters", IEEE Applied Power Electronics Conference and Exposition (APEC), pp. 211-217, 2017.

Schäfer, et al., "Zero-Voltage-Switching Auxiliary Circuit for Minimized Inductance Requirement in Series-Resonant DC/DC Converter Systems", IEEE Transactions on Power Electronics, vol. 36, Issue: 6, pp. 6469-6479, 2021.

Schäfer, et al., "Optimal Design of Highly Efficient and Highly Compact PCB Winding Inductors", Proceedings of the 19th IEEE Workshop on Control and Modeling for Power Electronics (COMPEL 2018), Jun. 2018.

* cited by examiner

INNOVATIVE PLANAR ELECTROMAGNETIC COMPONENT STRUCTURE

CROSS-REFERENCE TO RELATED APPLICATION

This application claims priority to foreign French patent application No. FR 2111347, filed on Oct. 26, 2021, the disclosure of which is incorporated by reference in its entirety.

FIELD OF THE INVENTION

The present invention relates to the field of planar magnetic components, such as inductors, coupled inductors, transformers. The invention relates more specifically to an innovative planar transformer structure.

BACKGROUND

Currently, almost all of the switched-mode power supplies incorporate magnetic components. These components can be bought as consumer product components and added to the design or developed in-house. The invention relates to this second possibility and in particular a category of magnetic components called planars. The main idea behind this technology is to incorporate the windings of the components inside the PCB. The planar magnetic components are a solution for power integration. These components are notably produced using flattened magnetic (ferrite) cores and windings produced in a printed circuit board (PCB). The advantages of these planar magnetic components are manifold: they allow a better incorporation of the component in the design, the reproducibility of the electrical characteristics of the component is increased, they allow a custom design of the component and therefore optimize it for use.

FIG. 1 schematically represents an example of implementation of a planar magnetic component 5 according to the state of the art. This component 5 is composed of an electrical circuit 6, consisting of one or more windings 7, which themselves consist of one or more turns (7-1, 7-2, 7-3, 7-4). The purpose of these windings is to produce a magnetic field. This field can be used for energy storage (inductance) or for transfer (transformer). The component 5 comprises a ferromagnetic core 8, which makes it possible to channel the magnetic field. This is then referred to as a magnetic circuit. This core 8 can be produced in several materials depending on the target application (power/frequency/price/bulk/performance). The core 8 can comprise an air gap 9, a small air space in the circuit, extending parallel to the plane of the circuit.

The circulation of the current in the electrical circuit generates losses in the same way as the circulation of the magnetic field in the magnetic circuit. The losses in the two elements are respectively called copper losses and iron losses. These losses are interdependent. It is therefore desirable to optimize the dimensions of each of the elements as a function of the application in order to maximize the overall performance levels.

SUMMARY OF THE INVENTION

The invention aims to mitigate all or part of the problems cited above by proposing a transformer comprising an innovative electromagnetic component structure that makes it possible to optimize the performance levels of the transformer by minimizing the losses, by enhancing the integration of the PCB (printed circuit board) by limitation of the vias at the periphery of components, by limiting the stray inductances and enhancing couplings.

To this end, the subject of the invention is a transformer comprising:

- a primary circuit comprising a primary winding of N1 turns of an electrically conductive wire, the primary winding extending from an input primary terminal to an output primary terminal; and
- a secondary circuit comprising a secondary winding of N2 turns of an electrically conductive wire, the secondary winding extending from an input secondary terminal to an output secondary terminal, N1 and N2 being each an integer number greater than or equal to 1;

the transformer being characterized in that it comprises:

- a printed circuit board extending on a first plane, and comprising a plurality of layers superposed on one another and forming an aperture through the first plane around a first axis and defining a perimeter;
- a ferromagnetic core, disposed around the primary and secondary windings, comprising a central part disposed in the aperture;
- a plurality of vias disposed at the centre of the primary and secondary windings on the perimeter of the aperture, and extending through the layers, each on an axis parallel to the first axis, the plurality of vias being configured to interconnect the plurality of layers;
- in that the N1 turns and the N2 turns of the electrically conductive wire are each disposed on one of the plurality of layers, according to any alternation between the N1 turns and the N2 turns, each of the N1 turns and of the N2 turns being wound, from a first via of the plurality of vias, partially around the plurality of vias forming a circular arc per layer, to a second via of the plurality of vias;
- and in that the circular arc of one layer is distinctly oriented with respect to the circular arcs of the other layers and has an orientation distinct from the circular arcs of the other layers.

Advantageously, the ferromagnetic core comprises an air gap extending on a second axis substantially perpendicular to the first plane.

Advantageously, the input terminals are superposed on the output terminals on a third axis substantially perpendicular to the first plane.

Advantageously, at least one out of the plurality of layers is a shielding plane, preferentially a ground plane.

BRIEF DESCRIPTION OF THE DRAWINGS

The invention will be better understood and other advantages will become apparent on reading the detailed description of an embodiment given by way of example, the description being illustrated by the attached drawing in which.

DETAILED DESCRIPTION

In the interests of clarity, the same elements will bear the same references in the different figures. For better visibility and in the interests of improved understanding, the elements are not always represented to scale.

Figure 1:
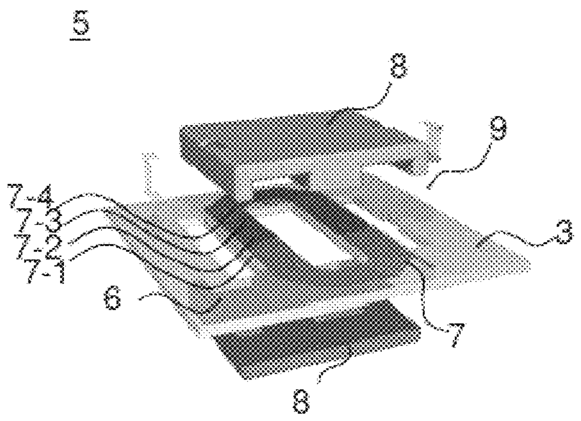
(Prior art) FIG. 1
FIG. 1 schematically represents an example of implementation of a planar magnetic component according to the state of the art.

FIG. 1 schematically represents an example of implementation of a planar magnetic component 5 according to the state of the art and has already been described in the introduction.

Figure 2:
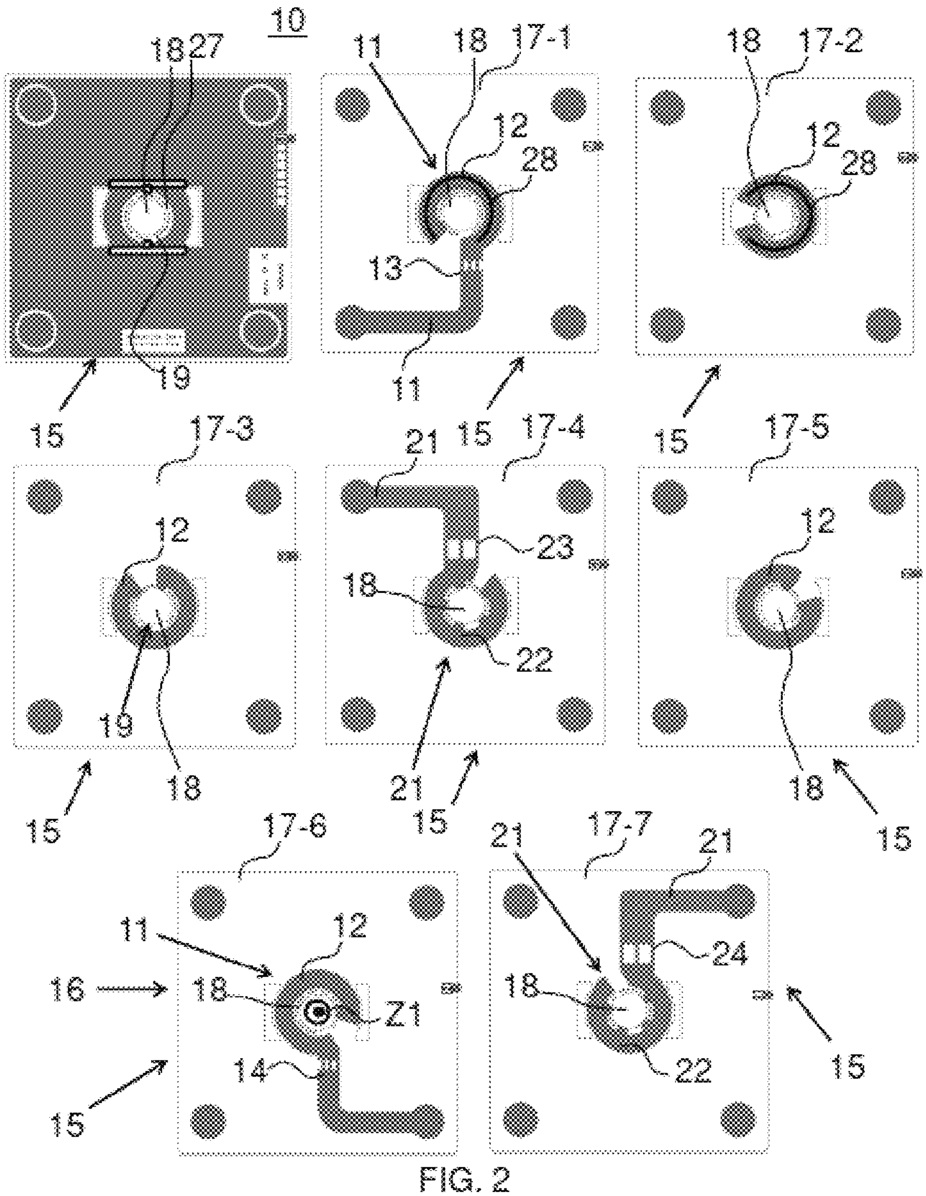
FIG. 2 schematically represents an example of disposition, around the central vias, of the primary and secondary windings of a transformer according to the invention.

FIG. 2 schematically represents a transformer 10 according to the invention with an example of disposition, around the central vias, of the primary and secondary windings. In this figure, the main elements of the transformer are represented by layers (normally superposed). It should be noted that this here is an illustration, the number of layers being indicated only as a nonlimiting example. A person skilled in the art will understand that this number of layers can be greater than or less than that of the figure. The transformer 10 comprises a primary circuit 11 comprising a primary winding 12 of N1 turns of an electrically conductive wire, the primary winding 12 extending from an input primary terminal 13 to an output primary terminal 14. The transformer 10 comprises a secondary circuit 21 comprising a secondary winding 22 of N2 turns of an electrically conductive wire, the secondary winding 22 extending from an input secondary terminal 23 to an output secondary terminal 24 (N1 and N2 each being an integer number greater than or equal to 1). The transformer 10 comprises a printed circuit board 15 (broken down in the figure into several layers) extending on a first plane 16, and comprising a plurality of layers 17-1, 17-2, 17-3, 17-4, 17-5, 17-6, 17-7 superposed on one another and forming an aperture 18 through the first plane 16 around a first axis Z1 and defining a perimeter 19. The transformer 10 comprises a ferromagnetic core 25 (not represented in this figure, but intended to be inserted into the aperture 18, and disposed around the primary 12 and secondary 22 windings, comprising a central part 26 disposed in the aperture 18). The transformer 10 comprises a plurality of vias 27 disposed at the centre of the primary 12 and secondary 22 windings on the perimeter 19 of the aperture 18, and extending through the layers 17-1, 17-2, 17-3, 17-4, 17-5, 17-6, 17-7, each on an axis parallel to the first axis Z1, the plurality of vias 27 being configured to interconnect the plurality of layers 17-1, 17-2, 17-3, 17-4, 17-5, 17-6, 17-7.

According to the invention, the N1 turns and the N2 turns of the electrically conductive wire are each disposed on one of the plurality of layers, according to any alternation between the N1 turns and the N2 turns. In other words, there is one turn (either of the primary winding, or of the secondary winding) per layer. And the "any alternation" means, in the superpositioning thereof, one turn of the primary winding can be superposed on one turn of the secondary winding or of the primary winding. All the combinations of superposition between primary and secondary can be envisaged. Each of the N1 turns and of the N2 turns is wound, from a first via of the plurality of vias 27, partially around the plurality of vias 27 forming a circular arc 28 per layer, to a second via of the plurality of vias 27. In other words, for each layer, the turn of the winding (primary or secondary) is not a complete turn, the turn does not make the 360° around the aperture 18. Thus, a few vias per layer are not surrounded by said turn. The central disposition of the vias adds great flexibility to the positioning of the layers which can be interleaved with respect to one another, and therefore to the positioning of the turns of the primary winding and of the secondary winding.

Furthermore, the circular arc 28 of one layer is distinctly oriented with respect to the circular arcs 28 of the other layers and has an orientation distinct from the circular arcs of the other layers. A turn, at the perimeter 19 of the aperture 18, can be considered to have a first end and a second end in proximity to the perimeter. The first and second ends are spaced apart by a certain number of vias. This spacing between the first and second ends is on each of the layers, and the respective spacings of the layers are not superposed.

The transformer according to the invention allows better integration and ease of implementation of a shielding in order to limit all the more the impact of leakage flux in the vicinity of the air gap. The minimization of the induction at the interconnections makes it possible to reduce the losses. All these aspects and advantages of the invention are detailed hereinbelow.

Figure 3:
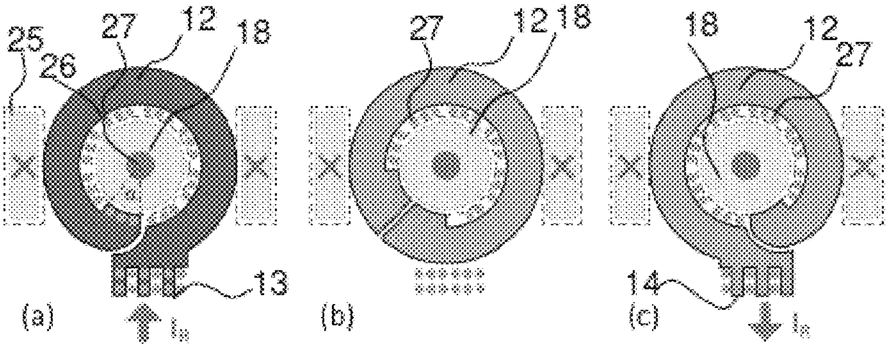
FIG. 3 schematically represents an example of vias disposed at the centre of the primary windings of an inductor according to the invention.

FIG. 3 schematically represents an example of vias 27 disposed at the centre of the winding 12 of an inductor 10 according to the invention. In this illustration, it must be considered that the diagram (b) is repeated six times and offset each time. The result thereof is an inductor with 7 turns of an electrically conductive wire (therefore N1=3), implemented on 8 layers (once again, only three layers are represented for better legibility of the figure). The winding 12 extends from the input primary terminal 13 to the output primary terminal 14.

The use of vias at the centre of the magnetic component allows for a simplified production of the various windings. For that, it is possible to reproduce an elementary winding on each of the layers (b) in order to produce the desired winding. A single turn is produced per PCB layer. The transition between the different layers is obtained via the central vias 27. One or more vias can be used for this purpose depending on the current desired in the windings and the size of the core 25 (and its central part 26).

This configuration of one turn per layer runs counter to the known practices. In fact, normally, in power electronics, the number of turns is spread out on a single layer (as shown in FIG. 1). The fact of considering one turn per layer here necessitates a large number of PCB layers if the aim is to produce a large number of turns. On the other hand, the fact that the vias are placed at the centre, on the perimeter of the aperture, makes it possible to reduce the layer-to-layer access resistances and frees up space at the periphery of the component, which allows better integration.

Figure 4:
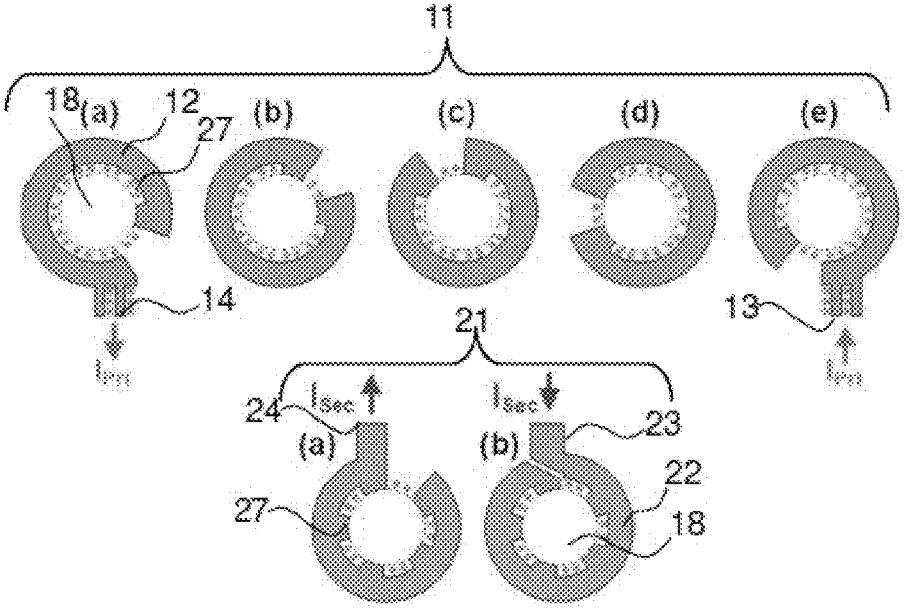
FIG. 4 schematically represents an example of implementation of the windings of a transformer according to the invention.

FIG. 4 schematically represents an example of implementation of the primary 12 and secondary 22 windings of a transformer 10 according to the invention. More specifically, the output winding is incorporated in the ring of central vias 27. In order to interleave the primary and secondary windings, here again the vias allowing the interconnections between the layers 17 are themselves also interleaved. The turns of the secondary winding can be each inserted between two turns of the primary winding and/or between one turn of the primary winding and one turn of the secondary winding. This configuration is advantageous for a transformer since it allows a better integration and facilitates the implementation of a shielding in order to limit as far as possible the impact of the proximity effects (and only in the case where the component has an air gap). The minimization of the induction at the interconnections allows reduction of the losses.

Figure 5:
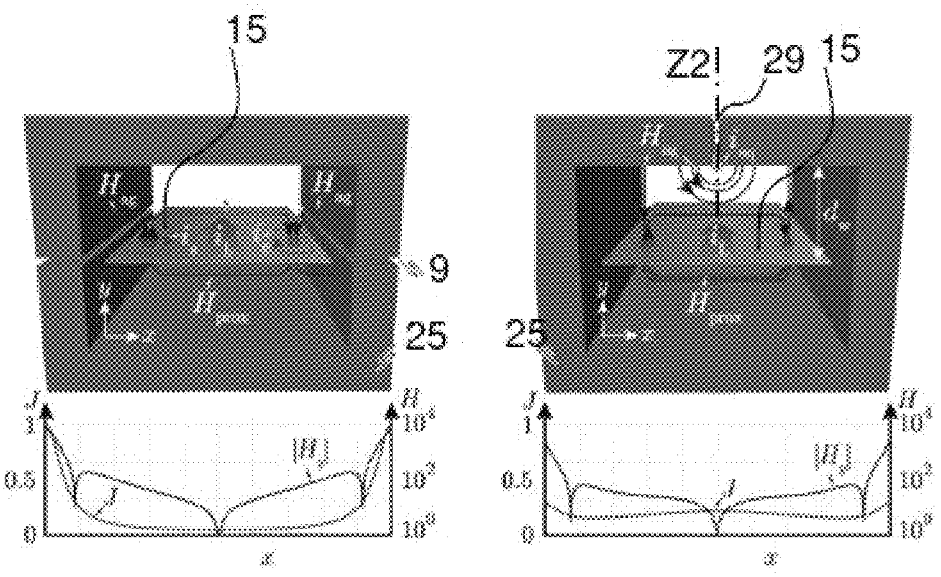
FIG. 5 schematically represents the variation of the current density according to a traditional disposition of the air gap and a disposition of the air gap according to the invention.

FIG. 5 schematically represents the variation of the current density according to a traditional disposition of the air gap (on the left of the figure) and a disposition of the air gap according to the invention (on the right of the figure). This representation is based on an illustration taken from the Schafer 2018 publication Optimal Design of Highly Efficient and Highly Compact PCB Winding Inductors. According to the invention, the ferromagnetic core 25 comprises an air gap 29 extending on a second axis Z2 substantially perpendicular to the first plane 16. The use of a vertical air gap 29 is made possible by the machining of the existing cores or of raw material. In the trade, the planar cores more often than not have an air gap disposed on the central leg which makes the field radiate in a direction parallel to the planar windings (see left-hand illustration). The configuration on the left of the figure represents a copper conductor at the centre subjected to leakage fields emanating from the two air gaps in the magnetic core. The current densities are concentrated on the edges of the conductor which reduces the efficiency of the solution. More specifically, in a traditional disposition of the air gap (called horizontal), the magnetic field is propagated in the core. At the air gap, the field lines radiate around the air gap and these field lines tend to concentrate the currents circulating in the conductor to the outside, so much so that the current circulates only on the outside, where the field lines are concentrated. In other words, only a small part of the conductor is actually used. In the configuration on the right of the figure, corresponding to the invention, the leakage fields arrive perpendicular to the conductor which allows the current density and therefore the losses to be reduced. More specifically, in a vertical disposition, the field radiates perpendicular (see right-hand illustration), which reduces the effects of proximity to the core and therefore reduces the concentration of current, at the ends, in the electrical circuit. The currents are concentrated on the surface and all of the conductor is used. The result thereof is a positive impact on the radiation. Thus, the resistance of the winding is reduced.

Figure 6:
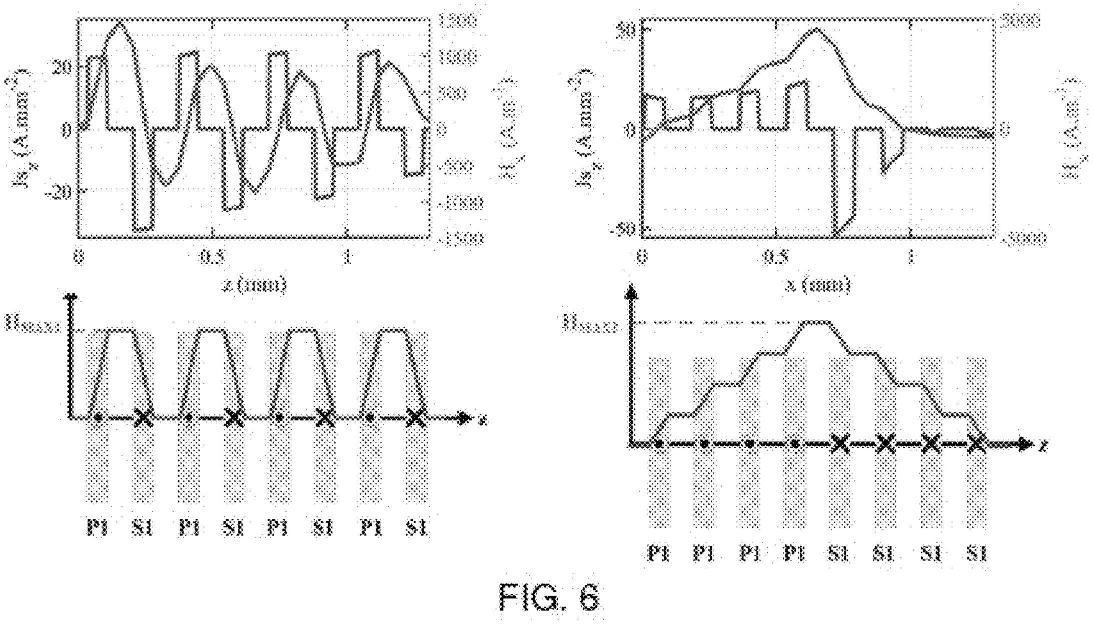
FIG. 6 schematically represents the induction between the conductors according to the alternation of the turns of the primary and secondary windings.

FIG. 6 schematically represents the induction between the conductors according to the alternation of the turns of the primary and secondary windings. In the bottom part of the figure, the conductors in a planar transformer are represented. The layers annotated P1 represent the primary conductors while the layers annotated S1 represent the secondary conductors. In the left-hand part of the figure, the turns of the primary winding and the turns of the secondary winding are disposed alternately, and the choice of the mode of alternation is facilitated according to the invention. In the right-hand part of the figure, the turns of the primary winding and the turns of the secondary winding follow one another, with no alternation between the primary and secondary windings. On the same diagram, the profile of the theoretical induction is given (H). The induction between the conductors increases the concentration of the currents therein, which increases the losses. It can be seen that, without alternation, the maximum induction obtained is greater than the maximum induction obtained in the case of a transformer according to the invention (with alternation of the turns). That generates a lot of losses by conduction between the two central layers (P1 and S1) which have a much greater resistance.

Figure 7:
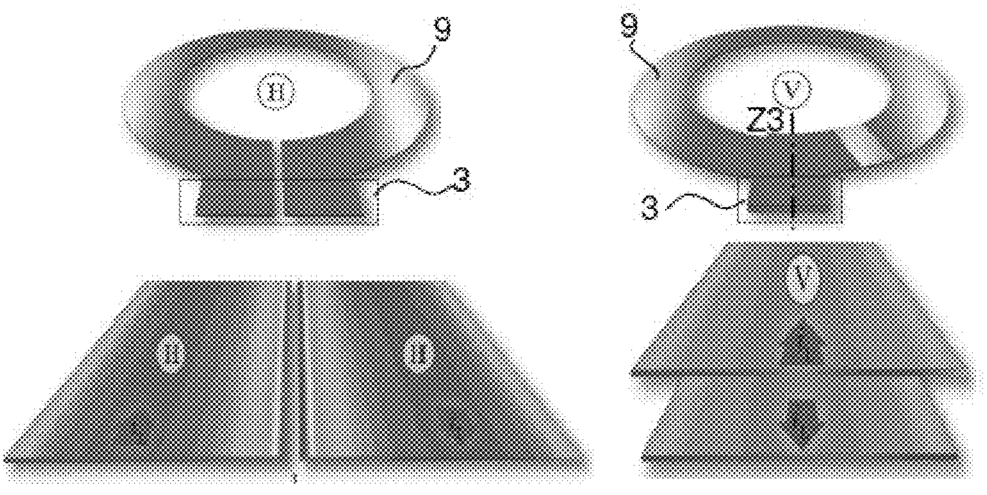
FIG. 7 schematically represents the homogenization of the current density in the input and output terminals of the primary and secondary windings disposed according to an embodiment of the invention.

FIG. 7 schematically represents the homogenization of the current density in the input and output terminals of the primary and secondary windings disposed according to an embodiment of the invention. This representation is based on an illustration from the Schafer 2018 publication Optimal Design of Highly Efficient and Highly Compact PCB Winding Inductors. In this embodiment of the invention, the input terminals 13, 23 are superposed on the output terminals 14, 24 on a third axis Z3 substantially perpendicular to the first plane 16, as can be seen in the top right part of the figure. That makes it possible to avoid the phenomena of field concentration between the two planes. With the terminals positioned in two different parallel planes, the current is more distributed throughout the plane and not only concentrated in the middle of a single plane. The bottom part of the figure represents the results of a simulation by finite elements of the current density with adjacent terminals (on the left of the figure) and superposed terminals according to the invention (on the right of the figure).

It emerges therefrom that the interleaving of the conductors makes it possible to reduce the induction between the conductors and therefore the concentrations of current. A disposition of the terminals vertically makes it possible to homogenize the current densities and therefore reduce the losses in the terminals.

Figure 8:
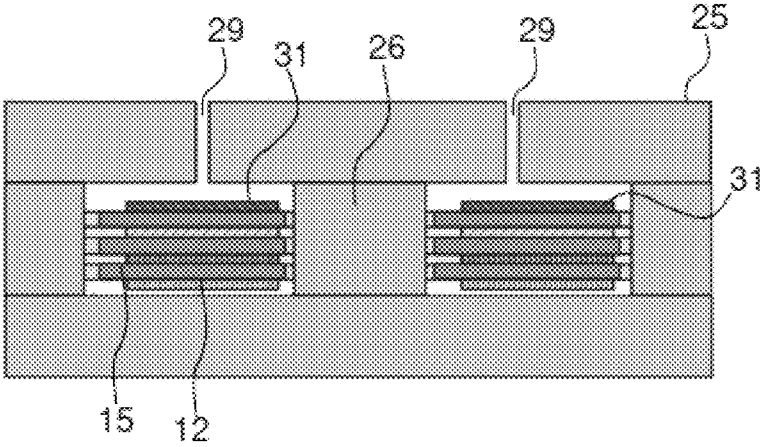
FIG. 8 schematically represents an example of implementation of a shielding layer in a transformer according to the invention.

FIG. 8 schematically represents a cross-sectional view, in a plane perpendicular to the first plane 16, of an example of implementation of a shielding layer in a transformer according to the invention. In one embodiment of a transformer of the invention, at least one out of the plurality of layers 27 is a shielding plane 31, preferentially a ground plane. The shielding plane concentrates the eddy currents which generate losses. Thus, by virtue of the shielding plane, these losses are generated in the shielding plane and no longer in the windings. The aim is to limit the total losses. The equivalent resistance of the circuit depends on the different resistances in the circuit. With shielding plane, this resistance is reduced.

The shielding plane 31 is most often a ground plane. The leakage field creates in this plane an induced current (eddy current) which generates losses therein. The distance from the shielding to the air gap, the thickness of the shielding and the distance from the shielding to the conductor depend on the power involved, on the operating frequency (and form of the signals), and on the performance sought with respect to the integration of the component.

In the general case, the implementation of the solution is profitable if it makes it possible to reduce the total losses. In a particular case of use that is the resonant converter, the reduction of the equivalent resistance of the conductors is a factor to be taken into account. Limiting this resistance makes it possible to facilitate the primary resonance and therefore the soft switching. In this particular case, it will therefore also be necessary to take account of the saving made by this operation on the magnetic dimensioning.

The invention makes it possible to enhance the overall performance of a planar magnetic component by a set of characteristics with many advantages:

- The disposition of the vias at the centre in order to produce the interconnection of the different layers, in particular in the case of the transformer with the vias of the primary and secondary windings and a flexibility in the choice of interleaving (that is to say interleaved between one another);
- The presence of a shielding plane associated with a vertical air gap which makes it possible to limit the effect of the leakage fluxes on the conductors. In a resonant configuration, this advantage is all the more exploitable;
- The optimization of the output terminals to enhance the synchronous rectification. This advantage is exploited above all in the converters with high output current and high operating frequency necessitating the use of one or more GaN transistors.

Figure 9:
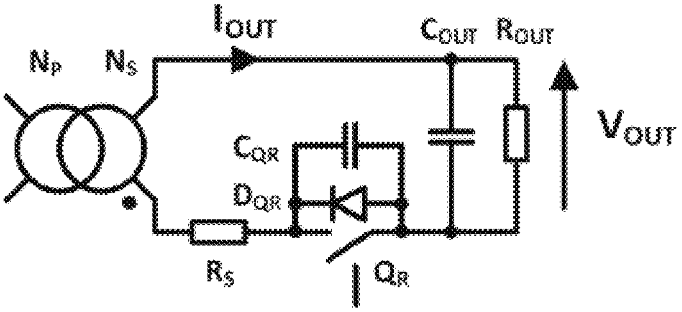
FIG. 9 schematically represents a conventional electrical circuit diagram of a synchronous rectifier.

FIG. 9 schematically represents a conventional electric circuit diagram of a synchronous rectifier. In this figure, on the left is represented the transformer (ideal coupler), Rs represents the spurious series resistance of the secondary winding and of the routing, QR the synchronous rectification transistor, DQR and CQR the spurious components associated with this transistor, Cout and Rout represent the output capacitance of the converter and the load respectively.

In the example that will now be dealt with, only two planes make it possible to produce the secondary winding. It is possible to imagine a different configuration in order to optimize the performance levels (more copper on the secondary means less losses).

Figure 10:
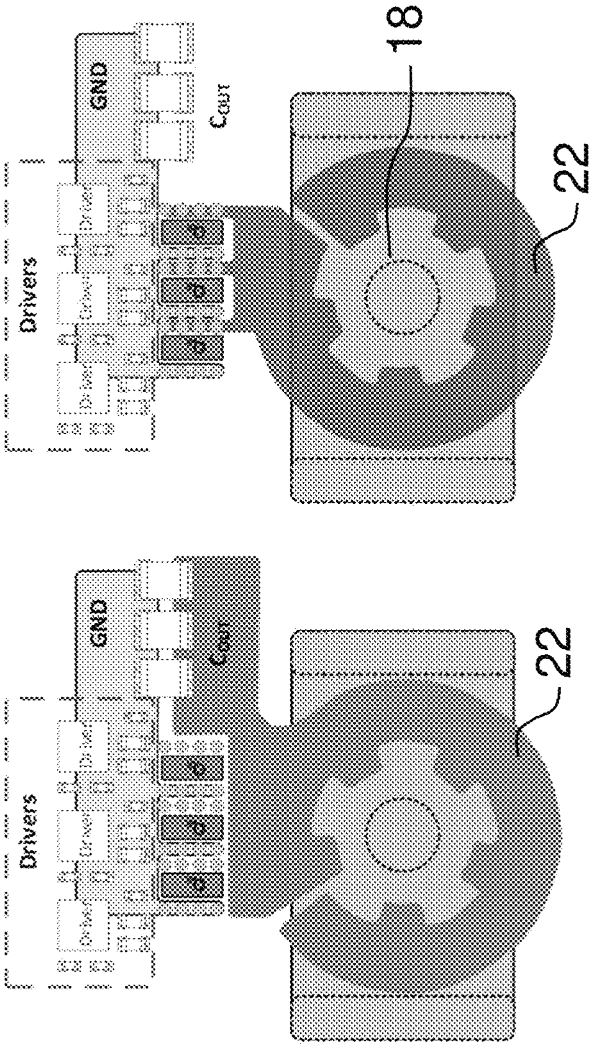
FIG. 10 schematically represents the optimization of the output terminals for the synchronous rectification according to the invention.

FIG. 10 schematically represents the optimization of the output terminals for the synchronous rectification according to the invention. As described previously, the winding can be produced by using one group of vias in every two. Through the optimization of the terminals of the transformer, it is possible to improve the integration of the secondary in order to minimize the losses in the synchronous rectification. Generally, a lowering of voltage between the primary and the secondary is applied. The result thereof is a voltage at the secondary that is lower than at the primary. That also means stronger currents on the secondary. It is desirable to minimize the resistance on the secondary terminals to optimize the performance levels. In the figure, the path of the current is minimized to the output.

This enhancement leads to a reduction of the resistance $R_s$ and of the spurious inductances at the secondary. Furthermore, it allows an easier increasing of the number of transistors at the synchronous rectification, which makes it possible to even further reduce the losses.

Finally, it is thus possible to place the drivers as close as possible to the transistors, a critical point for GaN transistors for example.

It can be stressed that the optimization of the various parameters of the magnetic components discussed above is adaptable to most of the converter configurations.

Thus, the invention comprises a number of technical features, that can be combined with one another, the technical effects of which are listed below:

Use of vias disposed at the centre of the planar (close to the central part). This configuration allows an easier distribution of the different windings without penalizing the integration outside the component. This disposition further allows a simplified interleaving of the layers.

Use of a machined air gap on the top of the magnetic core. Contrary to a horizontal disposition of the air gap, a vertical disposition orthogonal to the windings makes it possible to limit the effects of proximity to the windings and therefore reduces the copper losses above all at high frequency (>500 kHz).

Interleaving/superpositioning of the terminals on a vertical plane. The interleaving makes it possible to reduce the induction and therefore the strong concentrations of current. The vertical disposition makes it possible to use the total section of the planar conductors and therefore reduce the AC resistance.

Use of shielding planes. Situated as close as possible to the air gap, they make it possible to limit the effects of proximity on the conductors. The vertical disposition of the air gap associated with the shieldings minimizes the effects of the air gap on the conductors.

Optimization of the terminals for the integration of the GaN transistors. Since synchronous rectification operates at high frequency and high current, it is necessary to limit the spurious inductances and resistances at the secondary. An interleaved and optimized disposition of the secondary makes it possible to increase the performance levels of this type of system.

It will appear more generally to the person skilled in the art that various modifications can be made to the embodiments described above, in light of the teaching which has just been disclosed to him or her. In the following claims, the terms used should not be interpreted as limiting the claims to the embodiments explained in the present description, but should be interpreted to include therein all the equivalents that the claims aim to cover by virtue of their formulation and the anticipation of which is within the scope of the person skilled in the art based on his or her general knowledge.

The invention claimed is:

1. A transformer comprising:

a primary circuit comprising a primary winding of N1 turns of an electrical conductor, the primary winding extending from an input primary terminal to an output primary terminal; and a secondary circuit comprising a secondary winding of N2 turns of an electrical conductor, the secondary winding extending from an input secondary terminal to an output secondary terminal, N1 and N2 being each an integer number greater than or equal to 1;

the transformer comprising:

a printed circuit board extending according to a first plane, and comprising a plurality of layers superposed on one another and forming an aperture through the plurality of layers centered around a first axis (Z1), the aperture having a perimeter;

a ferromagnetic core, disposed around the primary and secondary windings, comprising a central part disposed in the aperture;

a plurality of vias disposed at a center of the primary and secondary windings along a perimeter of the aperture, and extending through the plurality of layers, each on an axis parallel to the first axis (Z1), the plurality of vias being configured to interconnect the plurality of layers;

in that one of the N1 turns or one of the N2 turns of the electrical conductor are disposed on each of the plurality of layers, according to any alternation of the N1 turns and the N2 turns, wherein each of the N1 turns and each of the N2 turns are wound partially around the plurality of vias from a first via of the plurality of vias to a second via of the plurality of vias to form a circular arc per layer; and in that each circular arc of one layer is distinctly oriented with respect to the circular arcs of the other layers.

2. The transformer according to claim 1, wherein the ferromagnetic core comprises an air gap extending along a second axis (Z2) substantially perpendicular to the first plane.

3. The transformer according to claim 1, wherein the input terminals are superposed on the output terminals on a third axis (Z3) substantially perpendicular to the first plane.

4. The transformer according to claim 1, wherein at least one out of the plurality of layers is a shielding plane, preferentially a ground plane.

* * * * *